United States Patent [19]

Sandling

[11] Patent Number: 4,597,556
[45] Date of Patent: Jul. 1, 1986

[54] ROTARY VALVE OPERATING MECHANISM

[76] Inventor: Michael J. Sandling, 9410 Dominion Cir., Cincinnati, Ohio 45243

[21] Appl. No.: 717,148

[22] Filed: Mar. 28, 1985

[30] Foreign Application Priority Data

Mar. 28, 1984 [GB] United Kingdom ............... 8407979

[51] Int. Cl.⁴ .................. F16K 31/122; F16K 31/54
[52] U.S. Cl. ...................................... 251/58; 251/250; 251/229; 251/335.3; 251/281; 137/556; 74/18.2; 74/109
[58] Field of Search .............. 251/250, 335.3, 229, 251/58; 74/18, 18.2, 424.8 VA, 422, 109, 89.17

[56] References Cited

U.S. PATENT DOCUMENTS

| | | | |
|---|---|---|---|
| 1,264,282 | 7/1916 | Dearing ........................... | 251/250 X |
| 1,360,833 | 11/1920 | Vuilleumier ................. | 251/335.3 X |
| 1,478,815 | 12/1923 | Blauvelt ....................... | 251/335.3 X |
| 2,983,479 | 5/1961 | Thomas ............................ | 74/422 X |
| 3,650,506 | 3/1972 | Bruton ............................. | 251/58 X |
| 4,201,366 | 5/1980 | Danko et al. ....................... | 251/335 |
| 4,468,002 | 8/1984 | Tremblay ........................ | 251/335.3 |

FOREIGN PATENT DOCUMENTS

| | | | |
|---|---|---|---|
| 662256 | 4/1960 | Canada ................................. | 251/250 |
| 0071750 | 6/1982 | European Pat. Off. . | |
| 1501936 | 6/1975 | United Kingdom . | |
| 2041172 | 1/1980 | United Kingdom . | |
| 2046373 | 3/1980 | United Kingdom . | |

Primary Examiner—Martin P. Schwadron
Assistant Examiner—John S. Starsiak, Jr.
Attorney, Agent, or Firm—Kinney & Schenk

[57] ABSTRACT

An operating mechanism for a rotary valve comprises a rack 18 reciprocatable within a housing 10 by an actuator 20 axially movable from outside the housing through an access aperture 30. The rack engages a pinion 14 connectable with a valve stem 16. A bellows seal 24 surrounds the actuator and is sealed at one end to the rack and at the other end to the housing about the aperture to prevent escape of any noxious fluids which might escape past the valve gland into the operating mechanism housing when sealingly mounted to the valve body.

12 Claims, 7 Drawing Figures

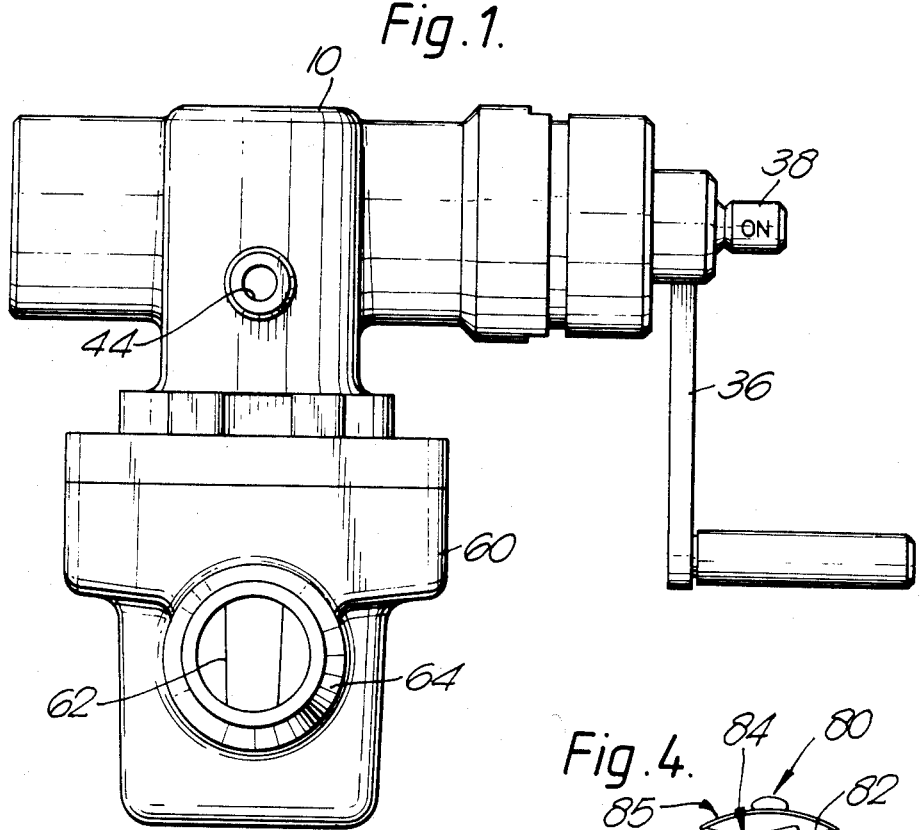
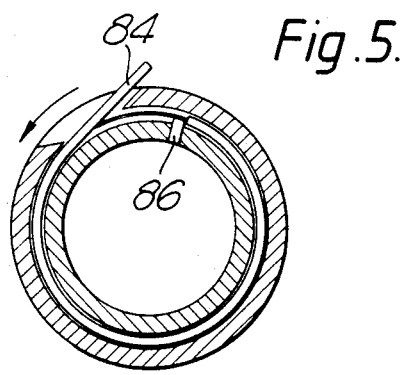
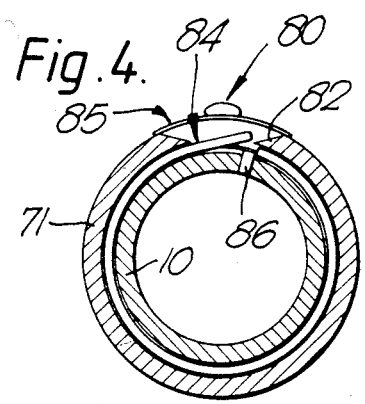
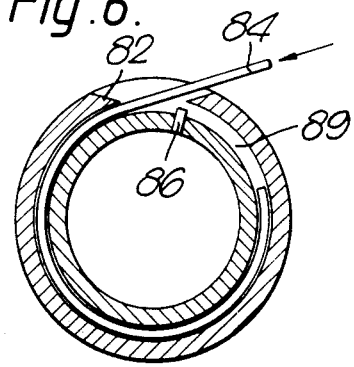

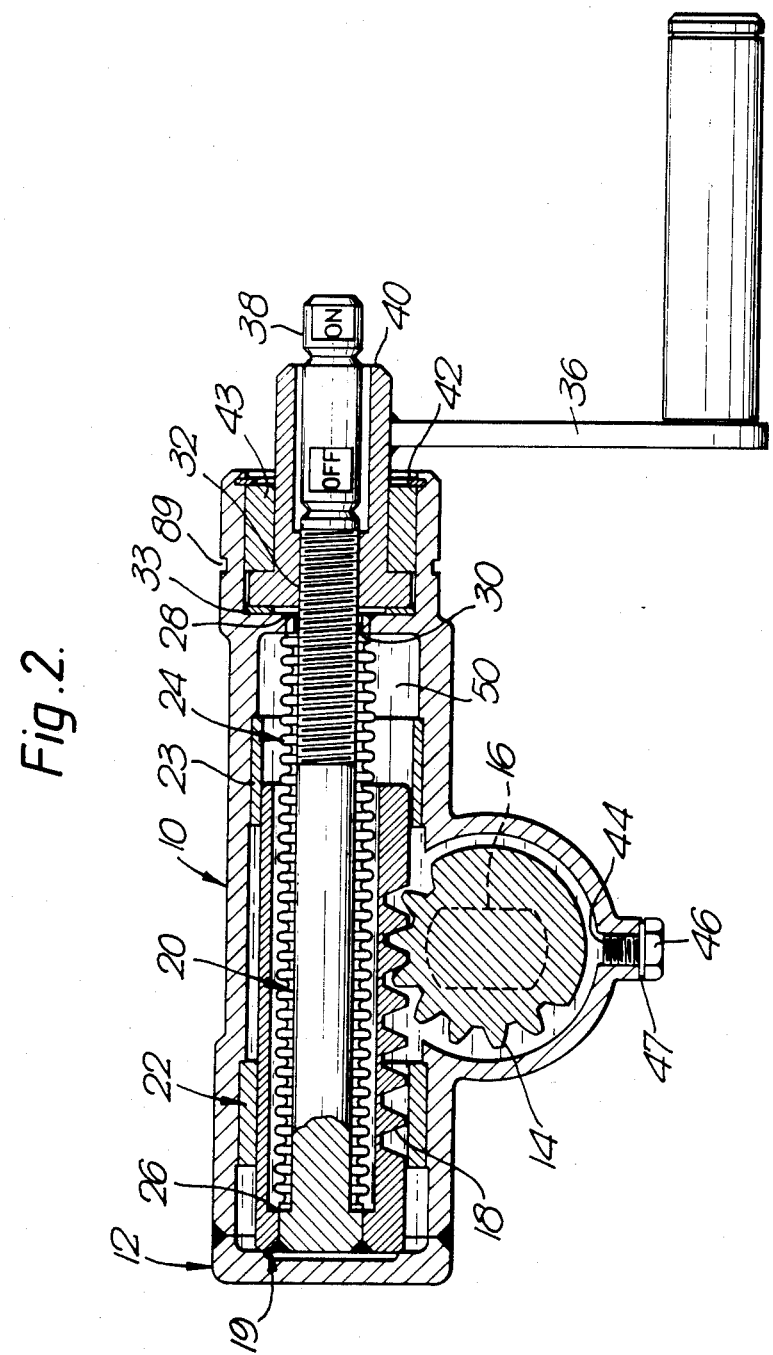

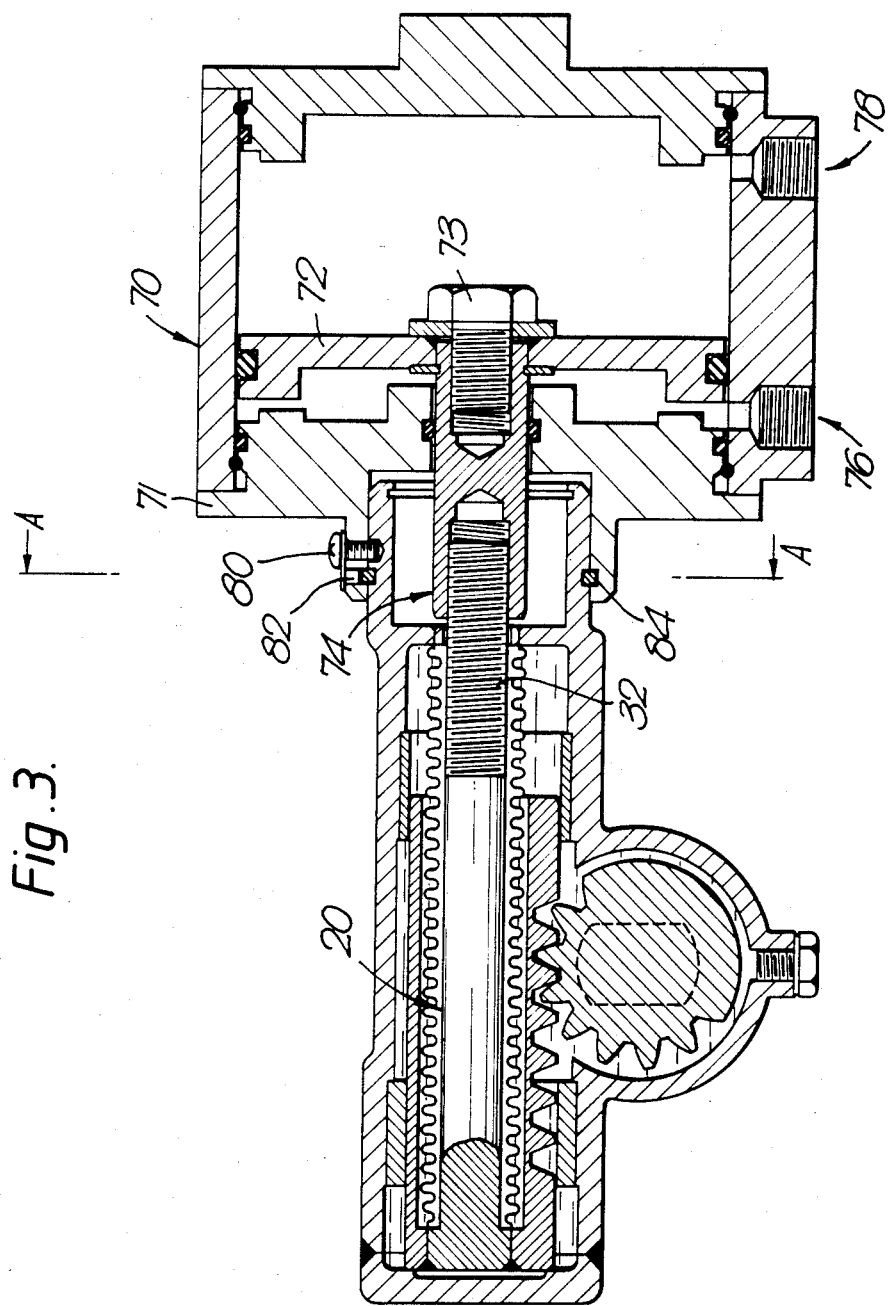

ROTARY VALVE OPERATING MECHANISM

This invention relates to an operating mechanism for a rotary valve and to a rotary valve embodying such operating mechanism.

When dealing with noxious and poisonous fluids, whether in the form of liquids, gases or mixtures thereof, special care must be taken in the valves controlling the flow of such fluids to ensure that even very small quantities of the fluids do not escape through the valve from the pipelines in which they are being conveyed. While many improvements have been made in the sealing of valves the leakages normally take place at the point of relative movement between valve actuating member and a portion of the housing through which it passes.

It is very difficult reliably to seal sliding and rotary joints in valves having rotary valve members which valves in themselves are desirable for use in view of the reliable sealing which can be obtained in the valve between a valve member and a co-operating seat with the minimum of disturbance to through-flow when such is required. The present invention is directed at providing an operating mechanism which enables a bellows seal to be utilised to provide reliable sealing when controlling the operation of a rotary valve despite the fact that bellows, conventionally made of metal due to the nature of the fluids being conveyed, is very sensitive to any applied torque which would tend very easily to damage the bellows.

In the specification of EP-A No. 2-0071750 there is disclosed an operating mechanism for a rotary valve in which a valve operating stem is rotatable by a rigid elongate actuator member provided with a control portion projecting through an access opening in a main housing, means for reciprocating the said actuator member cooperating with said control portion at a location exteriorly of the main housing, and a tubular flexible sealing bellows surrounding said actuator member, said bellows extending lengthwise of the actuator member and having one end sealingly secured to said housing about said access opening and the other end sealingly secured relative to the actuator member. While this reference uses a reciprocating member with a bellows sleeve thereabout it does not appreciate the advantages of longevity which can be achieved by proper support of the internal and external surfaces of the bellows and by keeping the reciprocating control motion linear as compared with the simultaneous pivotal movement of the control member in EP-A No. 2-0071750 which causes additional nonsymmetrical life shortening distortion of the bellows.

The present invention is characterised in that the valve operating stem is rotatable by a rack secured to the actuator member to be reciprocatable within the main housing, the rack comprising a toothed member carrying rack teeth engaging pinion teeth associated with said stem, the toothed member is tubular with the actuator member extending therewithin to define an annular space between the actuator member and the tubular member, said bellows being received in said annular space with the walls of said space being closely spaced from the internal and external surfaces of the convolutions of the bellows to provide support against deflection thereof.

With this arrangement the main housing of the operating mechanism can readily be fixed to the cover or mounting flange of a rotary plug, butterfly or ball-valve as required. By having a rack and pinion drive from the operating mechanism to the rotary valve stem no torsional forces are applied to the bellows thus restricting the likelihood of bellows damage. Since the bellows is mounted in the operating mechanism housing it can be protected from the possibility of solids getting to it, a common cause of failure or fracture of a sealing bellows being solid materials getting into the bellows convolutions. In the present instance the main housing of the operating mechanism protects the bellows from the possible ingress of solids from the outside whilst since the valve gland blocks communication from the pipeline in which the valve is mounted to the bellows there is no possibility of solids getting into the bellows convolutions from the fluid being controlled by the valve. A further advantage of the structure of the present invention is that as the device is attached to the valve downstream of the valve gland it is not normally exposed to, or under, pressure from the fluid passed along the pipeline and also it can be replaced very easily should the bellows fail through fatigue or for any other reason. Since any fluid leaking from the valve gland will communicate with the exterior of the bellows any pressure increase acting on the bellows as a result of valve gland leakage will cause the bellows to be urged inwardly with distortion of the bellows being resisted by the support of the internal surface of the bellows by the external surface of the actuator member encompassed by the bellows. The tubular form of the toothed member assists in providing a support preventing outward distortion of the bellows.

Suitably the actuator member may be in the form of a rod with the control portion being a threaded portion of the rod projecting from the housing. This threaded portion can either be used for connection of a reciprocatable actuator or may be used to engage a rotatable nut whereby rotation of the nut with the rotary nut being held against axial movement will cause axial movement of the rack. With a rotary handle being attached to the nut the operating mechanism acts as a gearbox to reduce the input effort required to operate the valve. In an alternative embodiment two bellows may be used. Thus the main mounting may have a second access opening aligned axially of the rack with a first access opening, a second tubular bellows being sealed at one end to the main housing about said second opening and at its opposite end to the actuator member. This use of two bellows can be used to balance internal pressure when used on higher pressure applications and also balances the natural spring of the bellows when the operating mechanism is used on valves requiring only an extremely low operating torque.

Preferably a sealingly closable aperture is provided from externally of the main housing to the interior thereof at a location in communication with the outer surface of the or each bellows. This aperture can be used as a tapping for testing whether any leakage has occurred past the valve gland. Also it can be used to test wheather the bellows is broken without removal of the operating mechanism and in some cases may also be used to apply an inert or line compatible fluid at a high pressure to prevent any line media passing the valve gland seal. In general all components of the operating mechanism which may be contacted by fluid being conducted through the valve may be constructed of a material compatible with that fluid.

The invention will be further described, by way of example, with reference to the accompanying drawings, in which:

FIG. 1 is an elevational view of a rotary flow control valve provided with an operating mechanism embodying the present invention;

FIG. 2 is a longitudinal sectional view of the operating mechanism of FIG. 1;

FIG. 3 is a view similar to FIG. 2 but showing the operating mechanism in combination with a fluid pressure operated actuator;

FIGS. 4, 5 and 6 are cross sectional views taken along the line A—A of FIG. 3 and showing various stages in the mounting of the actuator to the operating mechanism.

Figure 7:
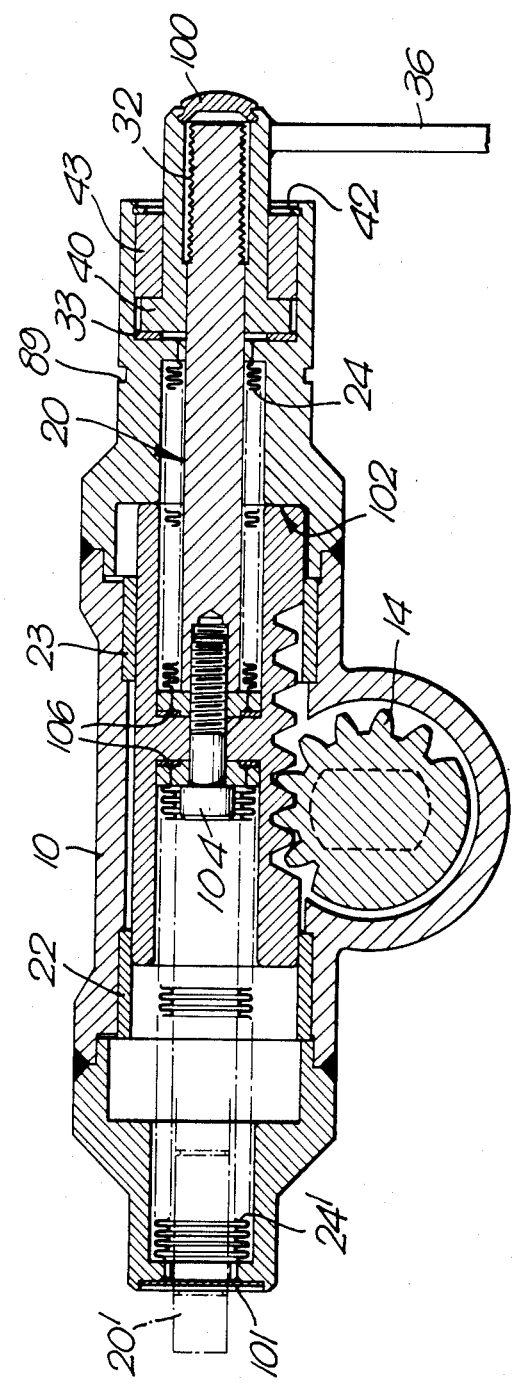
FIG. 7 is a view similar to FIG. 2 but showing a modified embodiment utilising two oppositely acting bellows.

Referring to the drawings, FIG. 1 illustrates a valve operating mechanism comprising a main housing 10 secured to the top of a rotary valve 60 on which can be seen a flange 64 for attachment to a fluid flow-line with a rotary valve member 62 being provided within the valve.

As can be appreciated from FIG. 2 the operating mechanism has within the housing 10, which is closed at one end by a welded-on end cap 12, a tubular rack member 18 having teeth which engage teeth of a pinion 14 mounted on the stem 16 of the valve. With this arrangement the valve stem 16 is rotated separately in response to reciprocating movement of the rack 18 with the Figure showing the valve in its fully open position with the rack at the limit of its leftward movement determined by engagement of the end 19 of the tubular rack member with the inner surface of the end cap 12 of the housing. The rack 18 is supported for reciprocated movement in the housing 10 by bearings 22 and 23.

Axially aligned with the tubular rack 18 is an access opening 30 to the housing 10 with an actuator member 20 projecting through this aperture. The inner end of the actuator member 20 is connected by welding to the tubular rack member so as to define an annular space between the rack member and the actuator member. Within this tubular space there is mounted a metal bellows 24 which is sealingly secured by welding at 28 to the housing about the access opening 30 and at its other end is sealed by welding to the actuator member 20 so that the bellows member 24 seals from egress through the aperture 30 medium 50 within the housing in communication with the valve stem.

The portion 32 of the actuator member 20 projecting through the aperture 30 is threaded and receives thereon a nut 40 retained against axial movement by a flange engaged between bearing rings 33 and 43. The bearing ring 43 is retained against axial movement from the cup-like end of the housing 10 by means of a circlip 42. A handle 36 is connected to the nut 40 for rotating the same to cause axial reciprocating movement of the rod 20 and thus of the rack 18. An indicator 38 is provided on the end of the actuator rod 20 projecting from the nut 40 and in the fully open position of the valve shown the only portion of indicator showing is that which indicates that the valve is open, or on. When, following rotation of the nut, the rack is in its fully rightward position with the valve shut the greater length of the actuator rod will be exposed from the end of the nut so as to show the "off" or valve closed indicator. Suitably the thread on the portion 32 of the actuator rod may be such that sixteen turns of the handle will be required for sufficient movement of the rack to move the valve stem through 90°. However it will be appreciated that by suitable dimensioning of the rack and pinion control of rotation of the valve through any desired angle up to 360° may be provided as required for possible multi-port valve applications.

The actual housing 10 can be secured to the valve 16 in any convenient way, for example by a gasketed bolted construction or by a seal weld.

FIG. 2 shows a modification of the operating mechanism in which the nut 40 and handle 36 manual operator has been replaced by a fluid pressure operated actuator 70.

As shown, the flag 38 has been removed from the end of the actuator rod 20 with the bearings 33 and 43 also having been removed from the illustrated cylindrical end portion of the housing 10. The actuator 70 comprises a housing portion 71 mounted on the cylindrical portion of the housing 10 by means of a retaining wire 84 acting as a key between a groove 89 in the external surface of the housing 10 and a corresponding groove in an inwardly facing cylindrical surface of the actuator housing portion 21. The actuator has a piston 72 reciprocatable within its piston housing in response to fluid pressure differentials applied through ports 76 and 78. The piston 72 is secured by a bolt 73 to a connector operating member 74 threaded onto the portion 32 of the actuator rod 20.

It would be appreciated that instead of the double acting piston actuator shown one could use, as required, a single acting spring return cylinder. Alternatively the actuator could be electrically powered for reciprocating motion.

The manner of securement of the actuator housing to the housing 10 is illustrated in FIGS. 4, 5 and 6. FIG. 4 shows the actuator housing on its secured position with a screw 80 with its end engaged in a detent recess in the housing 10 to restrain the actuator against rotary movement relative to the housing 10. Axial retention of the actuator is provided by the wire 84 acting as a key engaging opposite slots in the housing 10 and the actuator housing. Access for the key wire 84 is provided by an aperture 82 through the actuator housing with this slot being covered by a dust cover 85. In order to remove the actuator one would remove the location screw 80 and the dust cover 85, and then rotate the actuator anti-clockwise on the housing 10. A stop pin 86 in the groove 89 will push against the end of the wire 84 to urge the retaining wire out through the slot 82. One then removes retaining wire and rotation of the actuator is continued anti-clockwise until the connector member 74 has been unscrewed and released from the threaded portion 32 of the actuator rod.

Mounting of the actuator is the reverse of this in that first the actuator is fitted over the housing 10 so that the connector 74 engages the threaded end portion 32. The actuator is then rotated clock-wise until all the retaining wire grooves are aligned. The retaining wire 84 is then pushed as shown in FIG. 6, through the slot 82 until it engages the stop 86 with rotation continuing until the location screw 80 is aligned with the location recess with which it co-operates. The dust cover 85 is then refitted and the screw 80 applied in the location hole.

FIG. 7 shows an embodiment in which the operating mechanism comprises two oppositely acting sealing bellows which assists in balancing the effects of internal pressure which can become important on higher pressure applications when a substantial pressure may be exerted inside the housing. This embodiment also is of use where the natural spring of the bellows can be usefully balanced when the operating torques to be applied by the operating mechanism are extremely low.

As shown the pinion 14 is engaged by a rack similar to that shown in FIG. 2 with the exception that the tubular rack is provided with a central barrier provided with an aperture therethrough receiving a bolt 104. As illustrated the head of the bolt 104 holds the end of a second bellows 24 tight against a sealing gasket 106 on one side of the barrier and the shank of the bolt engages actuator rod 20 to hold it against a corresponding sealing gasket 106 on the other side of the barrier. Generally the remaining structure illustrated is similar to that of FIG. 2 with the exception that no indicator 38 is provided on the end of the actuator rod 20 but instead the hollow end of the nut 40 is closed by a rubber sealing grommet 100. In the position as shown the rack is illustrated in its rightmost, valve closed, position as determined by engagement with a stop shoulder 102 within the housing 10. As illustrated the left hand end of the housing 10 is closed by a disc 101 and there is no central member provided within the bellows 24′ to act as internal support for the bellows against pressure exerted in the housing 10. However, as shown by broken lines in FIG. 7, instead of the bolt 104 the rod 20′ may be provided similar to the rod 20 with the exception that it would have a threaded extension corresponding with the shank of the bolt 104 threadedly to engage the bolt 20 to fulfil the same function as the bolt 104. With this arrangement the rod 20′ would then provide internal support for the bellows 24′ and could also be provided with an indicator end which would project to a greater or lesser extent depending upon the position of the rack within the operating mechanism housing.

Illustrated in FIGS. 1 and 2 a threaded aperture 44 is provided to the exterior of the housing at a location in fluid communication with the interior space of the housing about the bellows. This aperture 44 is closed by a removable stopper 46 sealed by a gasket 47. The purpose of this stopper is to provide for selective communication with the interior of the housing. Thus in normal use the connection will be maintained closed. However, periodically tests can be made by opening the connection to see whether any leakage has occurred past the normal valve gland into the interior of the housing and thus give an indication as to whether repair of the valve gland is required. Also the connection can be used for pressure testing by applying pressure to the interior of the housing and checking whether any leakage occurs past the bellows 24. If leakage occurs then this provides an indication that replacement of the bellows is required to maintain the safety seal. An alternative use for this access opening is to apply pressure fluid to the interior of the housing with a fluid which is inert or at least compatible with the fluid in the pipeline controlled by the valve so as to provide a counterpressure against leakage of fluid through the valve gland.

Generally, it is believed that the foregoing description of the various embodiments of the valve are such that little further description is required of its manner of operation. Generally the housing 10 of the operating mechanism is simply attached to the valve by seal welding or by any other suitable means, with the pinion 14 drivably connected to the operating stem of the valve. The rack is then reciprocated by manual movement of the handle or by use of the actuator, depending upon which is connected, to rotate the valve member as required. Positive stops can be provided to limit movement of the rack to define a particular position although in some embodiments the rack may be sufficiently long for the valve stem to be rotatable through up to 360° to enable it to control a multi-ported valve. The bellows is protected from contamination by solids and against the application of torque so as to have a long life expectancy in providing a reliable safety device to prevent any possibility of small leakages of highly toxic or damaging fluids from the valve should any degree of failure of the valve gland occur. In the illustrated embodiment the bellows is confined between surfaces which helps to prevent undue distortion upon any pressures being exerted thereon and thus again assisting to prevent rupture of the bellows in use.

I claim:

1. In an operating mechanism for a rotary valve comprising a main housing having an access opening; a rotatable operating stem for said valve; a rigid elongate actuator member provided with a control portion projecting through said access opening; drive means whereby the operating stem is rotatable responsive to reciprocating movement of said actuator member; means for reciprocating said actuator member, such means cooperating with said control portion at a location exteriorly of said main housing; and a tubular flexible sealing bellows surrounding said actuator member, said bellows extending lengthwise of the actuator member and having one end thereof sealingly secured to said main housing about said access opening and the other end thereof sealingly secured relative to the actuator member; the improvement in that said drive means comprises a rack secured to the actuator member to be reciprocatable within the main housing; pinion teeth associated with said stem, the rack comprising a toothed member carrying rack teeth engaging said pinion teeth; the said toothed member is tubular with the actuator member extending therewithin to define therewith the walls of an annular space between the actuator member and the tubular member, said bellows being received in said annular space; and the said walls of said space are closely spaced from the internal and external surfaces of the convolutions of the bellows to provide support against deflection thereof.

2. A mechanism according to claim 1, wherein the actuator member has one end secured to the tubular member at a location defining a closed end of the annular space, the said one end of said bellows being sealingly secured adjacent said closed end of the space.

3. A mechanism according to claim 1, wherein the actuator member is a rod, the control portion of which is threaded and projects from the housing.

4. A mechanism according to claim 3, wherein the actuator member is non-rotatable within the housing and said means for reciprocating the control member comprises a rotary nut engaged with said threaded portion, means holding the nut against axial movement relative to said housing; and means for rotating the nut to cause reciprocating movement of the actuator member.

5. A mechanism according to claim 3, including a reciprocatable actuator threadedly engageable with the said threaded portion.

6. A mechanism according to claim 5, wherein the actuator includes fluid pressure operable means for controlling its reciprocatable position.

7. A mechanism according to claim 1, including a reciprocatable actuator comprising an actuator housing, and a piston reciprocatable in said actuator housing; means releasably securing the piston to the actuator member; and means releasably securing the actuator housing to the main housing.

8. A mechanism according to claim 7, including a removable wire detent by which the actuator housing is releasably secured to the main housing.

9. A mechanism according to claim 1, including a valve position indicator displaceable in response to movement of the rack.

10. A mechanism according to claim 1, including a second bellows oppositely acting relative to the first said bellows, said second bellows also sealing between the main housing and the actuator member.

11. A mechanism according to claim 10, wherein the main housing has a second access opening aligned axially of the rack with the first access opening, the second tubular bellows being sealed at one end to said main housing about said second opening and at its opposite end to the actuator member.

12. A mechanism according to claim 1, wherein a sealingly closable aperture is provided from externally of the main housing to the interior thereof at a location in fluid communication with the outer surface of the or each bellows.

* * * * *